May 8, 1928.
R. B. COZART
COTTON CLEANING MACHINE
Filed March 26 1927
1,669,286
2 Sheets-Sheet 1
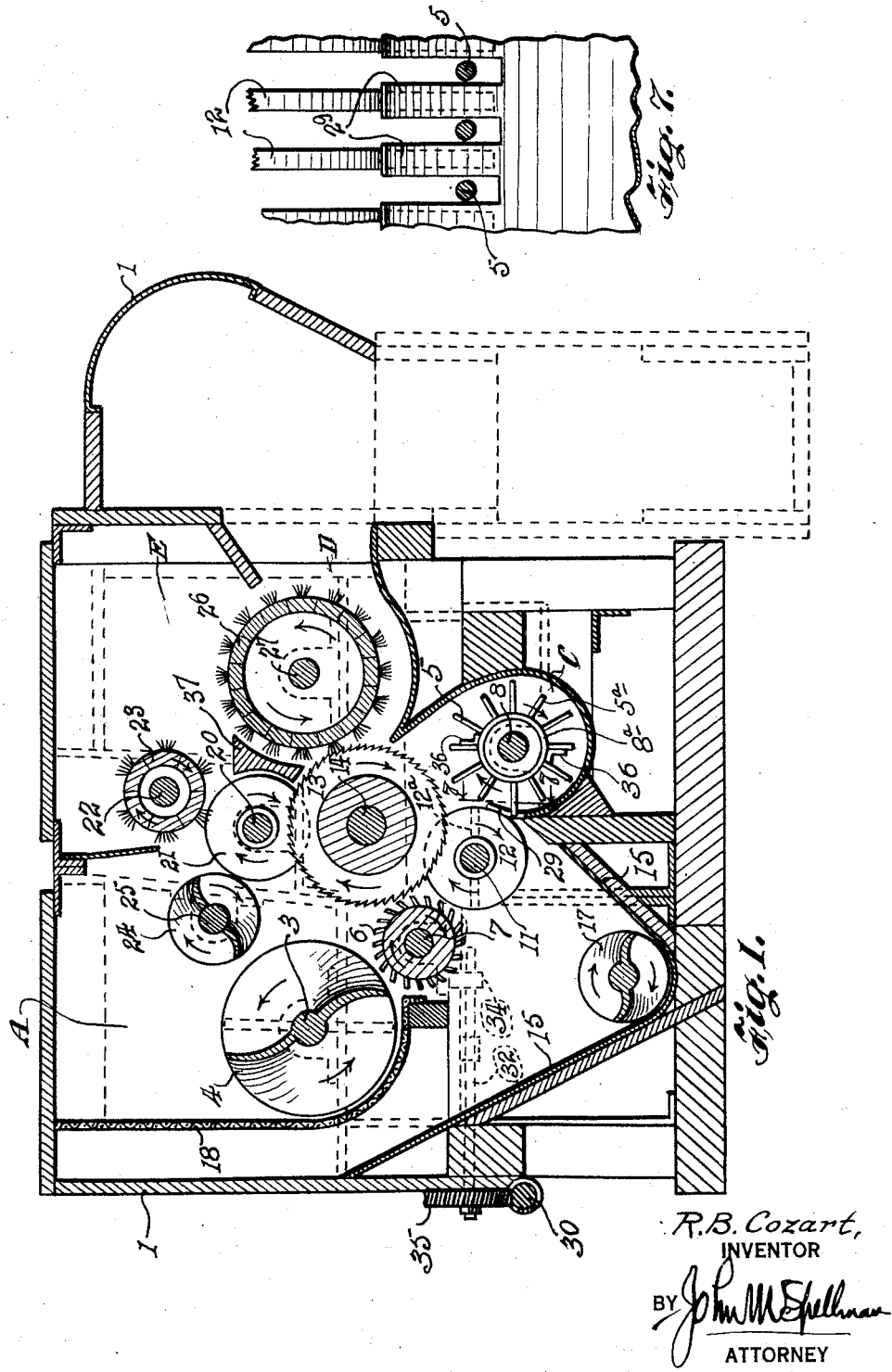

May 8, 1928.
R. B. COZART
1,669,286
COTTON CLEANING MACHINE
Filed March 26 1927
2 Sheets-Sheet 2
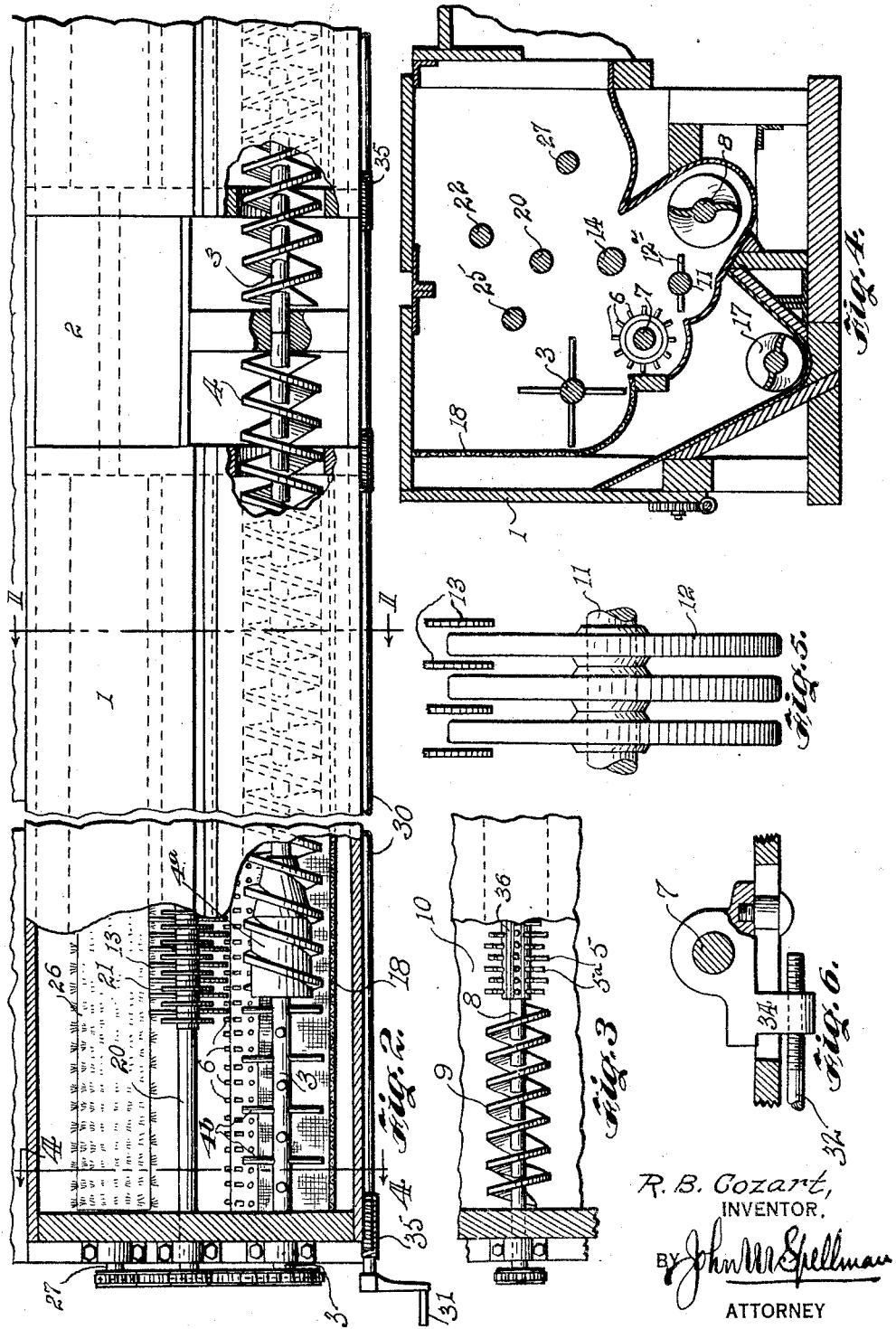
R. B. Cozart,
INVENTOR.
BY John M. Spellman
ATTORNEY Patented May 8, 1928.

1,669,286

UNITED STATES PATENT OFFICE.

ROBERT B. COZART, OF LUFKIN, TEXAS.

COTTON-CLEANING MACHINE.

Application filed March 26, 1927. Serial No. 178,534.

This invention has for its general object the provision of a cotton cleaning machine for the cleaning of seed cotton, that is, the removal of the burrs, trash, dirt, and other foreign matter, prior to the delivery thereof to a gin, and one of the paticular advantages derived thereof is the rapid and thorough removal of the seed cotton from the burrs and other foreign matter, by the running of circular disc saws between revolving disc ribs, which are meshed in between the saws, and the unique method of reclaiming the remaining cotton left in the burrs after they have passed into the reclaiming chamber and just prior to their discharge.

Other specific and particular objects of the invention are the improved methods of removing the burrs from the cotton, and means for rapidly removing burrs and other foreign matter from the machine, a more positive and efficient means of forcing the cotton against the saws.

With the above general and specific and further yet important objects in view, the invention will be clearly understood from the study of the following detailed description taken in connection with the accompanying drawings forming a part of this specification and wherein:

Figure 1 is a transverse sectional view through the machine, the view being taken along the line 1—1 of Figure 2.

Figure 2 is a top plan view of one end of the machine, portions of the casing being taken away.

Figure 3 is a detailed sectional view of one end of one of the reclaiming conveyor rollers.

Figure 4 is a sectional view similar to the view shown in Figure 1, the view taken in the same direction, but nearer the end of the machine, along the line 4—4 of Figure 2.

Figures 5, 6 and 7 are further detail sectional views of different parts of the machine, Figure 7, being taken along the line 7—7 of Figure 1.

Proceeding in accordance with the drawings and wherein similar numerals designate the various parts of the machine, 1 denotes a casing, which may be of any suitable size and contour. A hopper is indicated at 2 which provides for the entrance of the cotton at the center of the machine. Below the hopper and occupying a space longitudinally of the casing, is a chamber A, and journalled in each end thereof is a shaft 3. On this shaft is a spiral conveyor or blade 4 of usual well known construction, excepting that the hub $4^a$ which, towards the delivery end of the conveyor, is gradually enlarged so as to cause the cotton and burrs to be worked close to the saws. The blade 4 and enlargement $4^a$ terminate short of one end of the shaft and the remaining portion of the shaft, that is the remaining portion within the housing, is studded with spikes or pins $4^b$, the object being to give the unextracted cotton, burrs and other foreign matter a freer passage and aid their delivery from chamber A to picker roll 6, carried on shaft 7, thence to the reclaiming conveyor 9, carried on shaft 8, encased in reclaiming chamber C. Figure 4 shows this clearly. Shaft 7 is also journalled in the casing and traverses the latter from end to end, similar to shaft 3. Picker roll 6 has no spiral effect.

Particular attention is called to the reclaiming conveyor or roller, also journalled in the casing longitudinally thereof and mounted on a shaft 8. The associated parts carried on this shaft, however, are of different arrangement as compared with the parts carried on shaft 3, the spikes or pins being arranged spirally. The end of the shaft 8, meaning that end to the right of the casing in Figure 2, is shown in detail in Figure 3, the conveyor blade and spikes or pins being indicated at 9 and 5 respectively.

Between the shaft 7 and shaft 8 is journalled a shaft 11 and which includes a plurality of spaced revolving disc ribs 12. These revolving disc ribs are so spaced apart, as will be observed from Figure 5, as to permit the saws 13, also set at equal intervals along the saw shaft, to revolve between the revolving disc ribs. The revolving disc ribs, however, on the shaft 11 do not extend to the ends of this shaft, a portion of the end thereof being provided with pins $12^a$ for the purpose of passing the unclaimed cotton, burrs and trash between the shafts 11 and 14 to be delivered to the reclaiming conveyor mounted on shaft 8. The uncleaned seed cotton after being fed into the hopper 2 is carried along by the spiral conveyor 4 and when it reaches the end of the shaft 3, which carries the pins or spikes $4^b$, the cotton is then passed to the picker roll 6. From the picker roll near the end of the casing, the cotton is thrust between the shafts 11 and 14 to the second conveyor, that is, the reclaiming conveyor roller, comprising the shaft 8 and the spiral blade and spikes. A large portion of the burrs and foreign matter from the cotton which are separated therefrom during the initial travel of the cotton from the hopper fall through the screen 18, and between saws and roll 6, into the V shaped formation of the casing indicated at 15, being the burr and refuse chamber B, and are carried away or discharged by means of a conveyor 17. It should be understood that the drawing illustrates only one-half of the machine, that is the hopper occupies the central part thereof and in the drawing only one side of the machine is shown, that part to the right of the hopper in Figure 2, not shown, is the same identically as that part to the left in the drawing, hence the cotton is fed from the center of the machine on both sides of the hopper and passes through the machine in both directions, and the reclaiming chamber C has a discharge opening in center of machine, as does 15.

Journalled in the casing above the saw shaft 14 is a shaft 20 provided with spaced revolving disc ribs 21, similar in construction to shaft 11, except that shaft 20 contains only spaced revolving disc ribs 21. Above the shaft 20 is a brush cylinder 23, mounted on a shaft 22 and adjacent or near revolving disc ribs 21 is a conveyor 24, mounted on a shaft 25. The cotton is taken from the saws 13 by means of a brush cylinder 26, on shaft 27, and delivered through the opening D to a belt or screw conveyor, ready for the gin.

One of the particular features of the invention in connection with the reclaiming conveyor and roller is the means for sealing the burr chamber B from chamber C containing the reclaiming roller and for preventing cotton from being drawn into the burr and refuse chamber B. This is provided for by a plurality of serrated ribs 29, spaced apart, as shown in Figure 7. The roller carried on the shaft 8 is spirally studded with pins or spikes 5 and $5^a$, the pins being of different lengths. The arrangement is such that the longer pins 5 pass in between the serrated ribs 29 and also between the revolving disc ribs 12, while the shorter intermediate pins $5^a$ are in close contact. Consequently, any cotton or burrs which might momentarily rest upon or adjacent the ribs is immediately flicked or knocked off as the pins come around. The longer pins, passing swiftly through the spaces between the ribs of course prevent any cotton from being lodged there. This leaves these ribs clean at all times and prevents any cotton from being caught and by accumulation jamming or clogging the machine.

Referring to Figures 2 and 6, means are provided for adjusting the picker roll 6 with relation to its adjacent co-acting mechanism by rods 30 and crank handle 31, in connection with the rods 32 and bearing support 34 upon which the shaft 7 is mounted. The shaft 7 may require adjustment, which may be brought about by rotation of the crank 31 thus rotating the rod 30 which is formed with a worm engaging the worm wheel 35 fixed to shaft 32, even while the machine is in operation.

A further particular feature of the machine includes a plurality of angle iron rods or bars 36, carried between pins 5 and $5^a$ on reclaiming roller $8^a$. These bars effectually operate during the revolution of the shaft carrying the roller $8^a$ to throw the cotton, burrs and trash upwards against the saws to keep the cotton mass continually thereagainst. Without these bars 36 the pins would not force the cotton upwardly in such bulk as to provide for the effectual working operation of the machine whereby the rapid and thorough cleaning of the cotton is done.

Attention is called particularly also to an air panel or board 37, located between the brush cylinder and the upper disc ribs 21. This panel is for the purpose of gauging and adjusting the air current properly around the brush and revolving disc rib peripheries.

In practice the cotton is delivered into the machine in the usual manner through hopper 2 into chamber A, and is carried to the end of the machine, that is, to say to the left in Figure 2. The action is such that the cotton and foreign matter is carried along longitudinally by conveyor 4 which in turn lets the uncleaned cotton partially rest on the picker roll 6, which serves the triple purpose of feeding the cotton onto the saws, shedding many burrs and much trash by saws and into chamber B, and at the same time assists in the formation of a loose irregular shape roll of cotton burrs and foreign matter. Saws 13 separate the cotton from the burrs and other foreign matter by carrying the cotton between the revolving disc ribs 21 and 12 and the cotton is removed from the saws by the brush 26 and passed out through opening D. The burrs and foreign matter remaining in chamber A due to the action of the revolving disc ribs 21 travelling in an upward direction, and this motion in combination with the actions of the conveyors 4 and 24, picker roll 6, and saws 13 form a loose irregular roll, of uncleaned cotton, burrs and foreign matter, the top of which consists mostly of burrs and trash, and the swift action of the conveyor 24, the lower portion of which engages into the loose roll, very rapidly causes most all of the loose burrs and foreign matter which are on the outer periphery of the loose roll of cotton to be passed to the end of the casing, to be delivered into reclaiming chamber C.

In practice, the cotton is delivered into the machine in the usual manner through the hopper 2 and is carried to the end of the machine, that is to say, to the left in Figure 2. Some of the burrs, dirt and foreign matter falls through the screen 18 onto the conveyor 17. When the cotton in this partly cleaned state reaches the end of the conveyor, the pins 4ᵇ of shaft 3, force it against the picker roll 6 which in turn delivers to chamber C. The formation and arrangement of the revolving disc ribs 12 and 21 effectually prevent the undesirable refuse such as burrs, sticks and the like from passing in and such matter is thrown into the chambers B and C. In cotton cleaning machines heretofore constructed or now in use much difficulty and delay is caused by small sticks or stalks being carried past the saws with the cotton, particularly where such structures include a screen below the saws and these stalks must be gradually broken into small particles small enough to pass through such screen. In the present construction no screen is used below the saws and revolving disc ribs, the co-operative relation between these revolving disc ribs and saws being such that the revolving disc ribs and saws pass between each other and mesh in such a manner that these small sticks or stalks, which naturally will assume a horizontal position in the machine by the rotation of the shafts, will not be permitted to pass between the ribs,—hence they fall into the refuse chamber or pass on to chamber C. The cotton is next passed into the reclaiming chamber C and carried to the opposite end of the machine. In this final passage of the cotton the last remaining burrs and foreign matter are removed, such refuse passing out at a point below the central part of the reclaiming chamber C, the cleaned cotton having its exit through the opening D, thence onto a conveyor for entrance to the gin. The rotation of revolving disc ribs 21 serve to speed up separation by moving the burrs and foreign matter upward and out of the way of the oncoming cotton clinging to the teeth of the saws, consequently the separation is at all times made on a cleaned portion of the revolving disc ribs. Brush 23 serves to make a running seal between chamber A and chamber E, at all times keeping the top of the revolving disc ribs 21 swept clean thereby supplying a clean surface for separation as the revolving disc ribs make their cycles.

The invention is not to be understood as being restricted to the particular construction here shown in effecting the objects attained, but may be modified in keeping with the appended claim.

What is claimed is:

A cotton cleaning machine comprising the combination of a casing, a hopper communicating therewith, a spiral conveyor operating within said casing for feeding cotton longitudinally thereof, a series of spaced rotating saws mounted in said casing, a picker roll rotatably mounted between said spiral conveyor and said saws for feeding cotton from said conveyor to said saws, said spiral conveyor having a hub portion thereof enlarged to work the cotton close to said picker roll, a series of rotating disks operating between said saws and cooperating therewith to extract the cotton from the burrs, a brush mounted for rotation and adapted to remove the cotton from said saws, a reclaiming conveyor for conveying the burrs longitudinally of the machine in a direction opposite that of said spiral conveyor and along the lower edges of said saws for a recleaning operation, said reclaiming conveyor comprising spaced alternate circumferential rows of spikes, said alternate rows of spikes being of different lengths and being provided with a plurality of angle iron bars for the purpose of pitching and tossing the cotton against said saws, a chamber in which said reclaiming conveyor rotates having a wall formed with spaced-apart serrated ribs, the longer of said spikes rotating between said ribs and the shorter of said spikes rotating in close proximity thereto to dislodge any cotton therefrom and to seal said chamber from entrance of cotton thereinto.

In testimony whereof I affix my signature.

ROBERT B. COZART.